B. V. AND V. J. McCAUL AND F. L. BAYLEY.
CLUTCH AND OPERATING MEANS THEREFOR.
APPLICATION FILED MAY 3, 1919.

1,359,407.

Patented Nov. 16, 1920.
2 SHEETS—SHEET 1.

Witnesses
J H Crawford

Inventor
B. V. McCaul,
V. J. McCaul,
F. L. Bayley,
By Victor J. Evans
Attorney

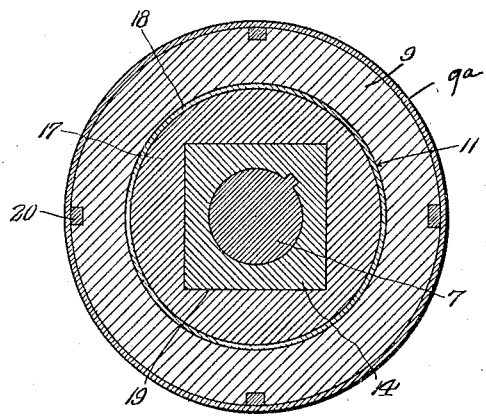
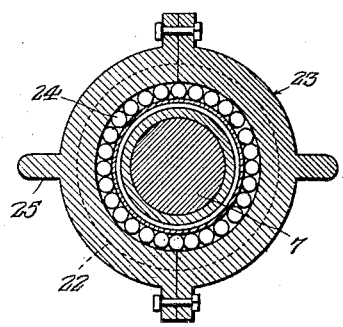
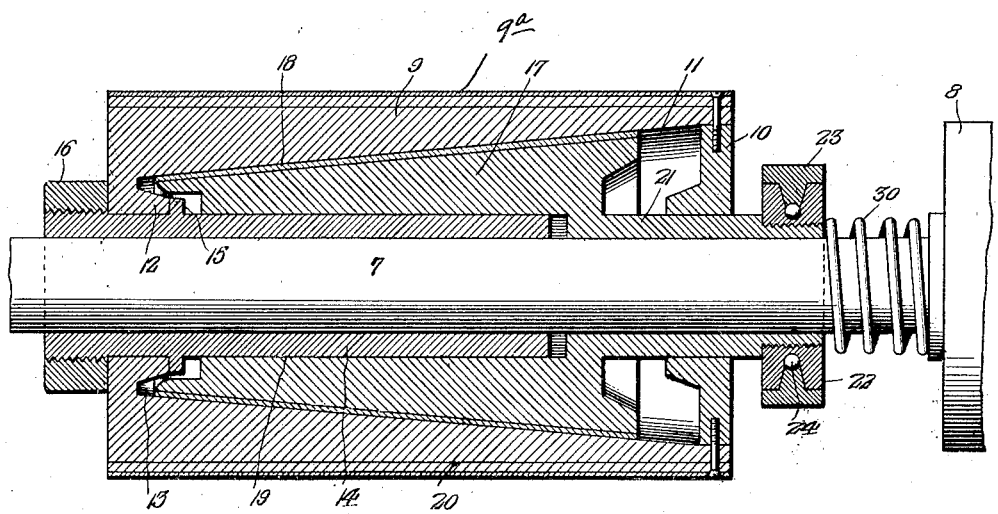

UNITED STATES PATENT OFFICE.

BENJAMIN V. McCAUL, VERNE J. McCAUL, AND FRANCIS L. BAYLEY, OF AYR, NORTH DAKOTA.

CLUTCH AND OPERATING MEANS THEREFOR.

1,359,407.

Specification of Letters Patent. Patented Nov. 16, 1920.

Application filed May 3, 1919. Serial No. 294,562.

*To all whom it may concern:*

Be it known that we, BENJAMIN V. McCAUL, VERNE J. McCAUL, and FRANCIS L. BAYLEY, citizens of the United States, residing at Ayr, in the county of Cass and State of North Dakota, have invented new and useful Improvements in Clutches and Operating Means Therefor, of which the following is a specification.

Our present invention pertains to clutches and means for operating the same.

The general object of the invention is the provision of a clutch and clutch operating means, designed for use on a grain separator, in lieu of the regular cylinder pulley employed on separators, with a view of enabling a single attendant while working about the separator to expeditiously and easily stop the separator in the event of trouble. Through the medium of our improvement, the clutch may be actuated to stop the separator from the top or from any other point about the separator, and hence the improvement obviates the necessity of the attendant approaching the clutch and also renders it unnecessary for the operator to run from the separator to the engine that is generally located at a considerable distance from the separator.

Our improvement also contemplates so constructing the clutch that it does not interfere in any manner with the usual belt connection between the engine and the separator.

With the foregoing in mind, the invention will be fully understood from the following description and claim when the same are read in connection with the drawings, accompanying and forming part of this specification, in which:

Fig. 3 is an enlarged longitudinal and diametrical section showing the arrangement of the clutch members relative to the pulley cylinder.

Figs. 4, 5 and 6 are sections hereinafter specifically referred to.

Similar numerals of reference designate corresponding parts in all of the views of the drawings.

Our improvement contemplates providing the separator body 1 with a sheave 2, and also contemplates the employment of a cable 3 that is carried about the said sheave 2 and forwardly to the point at which an operator is usually positioned when in attendance on the separator. The cable may be secured in a loose manner at the said point with a view to always being within convenient reach of the operator.

Figure 2:
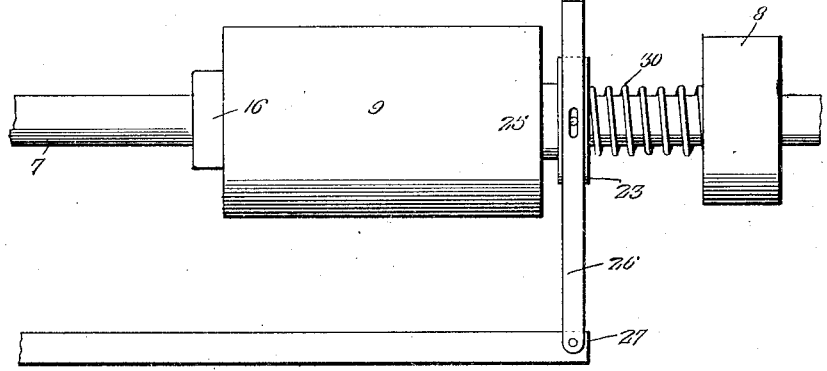
Fig. 2 is an enlarged elevation illustrative of the arrangement of the improvement relative to the separator.

From the sheave 2 the cable is carried and connected to a lever 4 for disengaging the clutch, and in conjunction with the said lever we employ a bar 5 having beveled or ratchet teeth 6, Fig. 2. From this it follows that when the cable 3 is pulled upon to move the lever 4 toward the right in Fig. 2, so as to open the clutch and stop the separator, the lever will be held by one of the teeth 6 and consequently there will be no liability of the separator accidentally starting while the operator is away from the same.

At 7 is the drive shaft of the separator, and at 8 is the blower belt pulley on said shaft.

Loosely surrounding the shaft 7 is the cylinder pulley 9, designed to be connected through the medium of a belt (not shown) with the drive shaft of a traction engine, also not shown. At one end the cylinder 9 receives and is connected to a collar 10. Said cylinder 9 is provided with a taper bore 11, and at its opposite end is provided with an inwardly directed portion 12 and an annular space 13 that surrounds said inwardly directed portion.

Keyed, see Fig. 4, or otherwise fixed on the shaft 7 is a sleeve member 14 that is exteriorly of angular form and cross-section and is provided with a peripheral projection 15, opposed to the inwardly directed portion 12 of cylinder 9. It will also be observed that the sleeve member 14 is provided with a nut 16 that is opposed to one end of the cylinder 9.

Arranged and movable endwise in the taper bore of the cylinder 9 is a clutch member 17 that is provided with a facing 18, of leather or other suitable friction-creating material. The said clutch member is provided with a bore 19 of angular form in cross-section, and of a size to snugly receive the sleeve member 14.

At 20 are what may be properly denominated as lagging blocks, to hold leather lagging 9ª on the cylinder 9. Said blocks 20 are preferably of wood, and the lagging is fastened thereto.

The clutch member 17 is provided with a sleeve 21, and fixed to the said sleeve is a circumferentially grooved wheel 22, between which and a surrounding collar 23, balls or other anti-friction devices 24, are interposed as shown. The collar 23 is preferably a split collar, and is provided at diametrically opposite points with journals 25 that are disposed in the arms 26 of the lever 4, fulcrumed at 27 on the separator frame.

Figure 1:
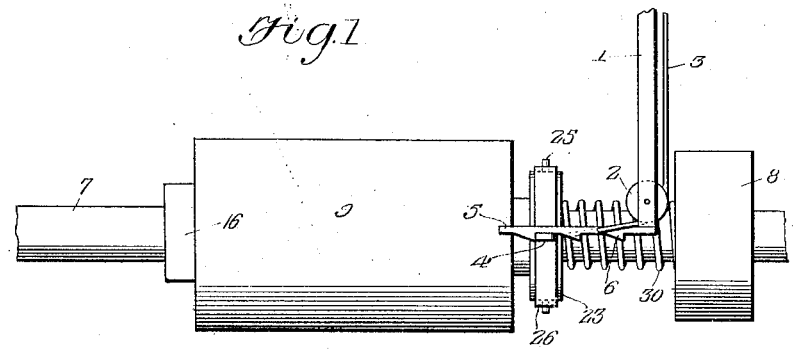
Figure 1 is a view showing a separator equipped with our improvement.
Figure 6:
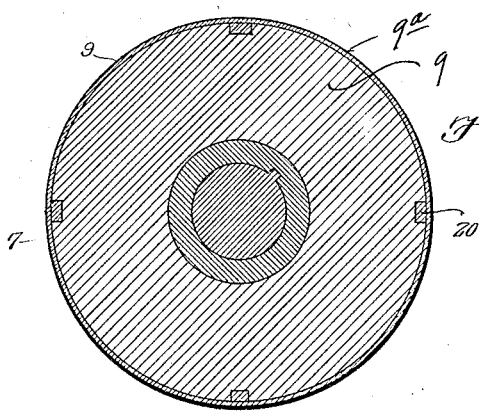

Interposed between the outer end of the sleeve 21 on the clutch member 17 and the pulley 8 or any other suitable abutment on the shaft 7 is a spring 30 that is put under tension by the disengagement of the clutch member 17 from the cylinder pulley 9 and is adapted normally to maintain the clutch member 17 in engagement with the pulley 9 so as to cause the said pulley to transmit motion to the shaft 7. When, however, the clutch member 17 is drawn endwise out of engagement with the cylinder pulley 9, by the attendant drawing on cable 3 and moving lever 26 toward the right in Fig. 2, the said pulley 9 will continue to turn while the shaft 7 is at rest. Manifestly, that portion of the sleeve 14 on which the cylinder portion 12 is arranged is of circular form in cross-section, as shown in Fig. 6, so as to enable the pulley 9 to turn freely about said sleeve portion when the clutch member 17 is disengaged from the cylinder portion so as to leave the shaft 7 at rest. When the cable 3 is relieved of pull, the spring 30 will thrust the member 17 toward the left in Fig. 3, when rotation of shaft 7 will be resumed.

It will be manifest from the foregoing that our novel clutch *per se* is housed within the cylinder pulley 9, and is otherwise compact and strong and therefore well adapted to withstand the rough usage to which separator appurtenances are ordinarily subjected.

The construction herein shown and described constitutes the best practical embodiment of our invention of which we are cognizant; but it will be apparent that in the future practice of the invention such changes or modifications may be made as fairly fall within the scope of our invention as defined by the appended claim.

Having described our invention, what we claim and desire to secure by Letters Patent, is:—

In a clutch construction, the combination of a shaft, a sleeve member fixed to the shaft and having a radial projection at an intermediate point of its length, and also having a portion of angular form in cross-section, a nut secured on one end of said sleeve member and spaced from said projection, a cylinder pulley loosely surrounding the shaft and sleeve member and having a taper bore and an inwardly directed portion loose on the sleeve member and interposed between said projection and nut, an endwise movable exteriorly tapered clutch member, having an angular bore receiving the angular portion of the sleeve member and also having a sleeve extending outwardly from one end of the clutch member, a collar fixed in the end of the pulley and loosely and snugly surrounding said extended sleeve, a wheel fixed on said shaft, a collar loosely surrounding said sleeve, and a spring surrounding the shaft and interposed between the clutch member and an abutment on the shaft.

In testimony whereof we affix our signatures.

BENJAMIN V. McCAUL.
VERNE J. McCAUL.
FRANCIS L. BAYLEY.